Dec. 26, 1961  W. R. P. DELANO  3,014,517
ANTI-SKID DEVICE

Filed Feb. 18, 1960  2 Sheets-Sheet 1

INVENTOR.
WILLIAM RICHARD POTTER DELANO
BY
Davis, Hoxie, Faithfull & Hapgood
ATTORNEYS.

Dec. 26, 1961 W. R. P. DELANO 3,014,517
ANTI-SKID DEVICE
Filed Feb. 18, 1960 2 Sheets-Sheet 2

INVENTOR.
WILLIAM RICHARD POTTER DELANO
BY
Davis, Hoxie, Faithfull & Hapgood
ATTORNEYS.

United States Patent Office 3,014,517
Patented Dec. 26, 1961

3,014,517
ANTI-SKID DEVICE
William Richard Potter Delano, Old Field Road,
P.O. Box 96, Setauket, N.Y.
Filed Feb. 18, 1960, Ser. No. 9,591
4 Claims. (Cl. 152—236)

The present invention relates to anti-skid devices for tires and more particularly to a rim clip for independent sections of the cross-chain type and to such independent sections.

The conventional metal link annular cross-chain type of anti-skid device is difficult to fasten to automobile tires due to its bulk and weight. Generally, two persons are required to secure such annular chains to mounted tires. As an alternative to such annular chains, independent sections which fasten onto the tire by individual straps through slots between the hub and the wheel rim may be used. However, certain recent automobile wheels do not have suitable slots for such fastening. In addition, the tight securing of individual straps is sometimes difficult for women and under adverse weather conditions.

A feature of the present invention is a novel clip which is secured onto the rim of the wheel. This clip is then interlocked with another clip onto which individual sections of cross-chain are secured. This rim clip, once secured, need not be removed when the cross-chains are not used. This clip is adapted to fit any size of automobile wheel rim.

Conventional independent sections of the cross-chain type are constructed of interlocked metal links. On roads bare of snow these chains make an unpleasant clatter noise and wear rapidly.

Another feature of the present invention is a flexible cross-member of independent sections. This flexible member may economically be made of a rubber compound similar to that used in tires. To prevent skidding on ice, the outer surface of the rubber compound has thereon a friction material such as emery, dolamite or Carborundum.

Other features and advantages of this invention will become apparent from the following description and accompanying drawing, in which.

Figure 1:
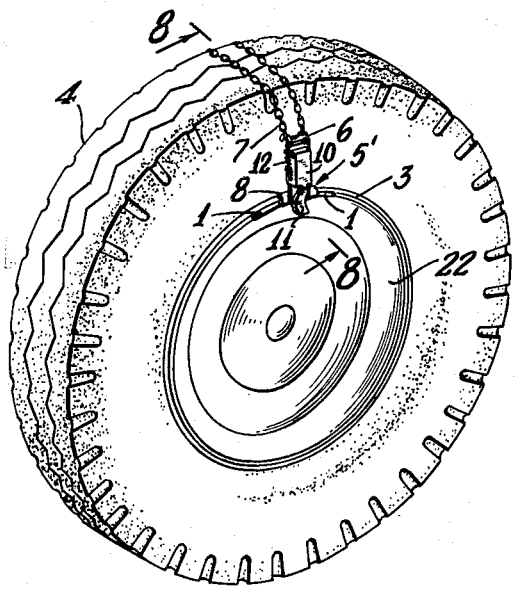
FIG. 1 is a side view of an automobile tire upon which one anti-skid device of this invention is fastened.
Figure 8:
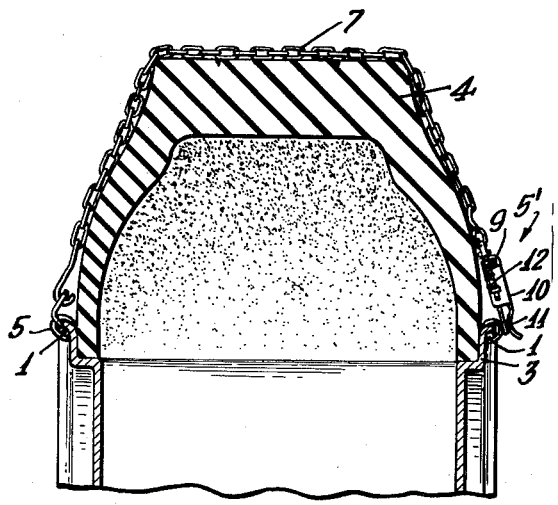
FIG. 8 is a cross-section through the tire of FIG. 1 illustrating two rim clips secured to opposite rims of the wheel.

In the drawings, (see FIGS. 1 and 8) tire 4 is an ordinary automobile tire mounted on wheel 22. Wheel 22 has annular wheel rim 3 in the form of an annular U-shaped member upon whose upraised rims rim clips 5' are secured on the inner and outer sides of the wheel. Clip 5' is part of fastener 6 which is secured to chain 7. A plurality of individual sections of this anti-skid device may be utilized depending upon the snow, ice or mud conditions on the roads. Under extreme road conditions, the action of a snow tire can be simulated by securing six to eight individual sections to each tire. In FIG. 8 one fastener 6 is shown secured to one side of wheel 22 and holding one end of chain 7, the other end of chain 7 being held by rim clip 5.

Figure 4:
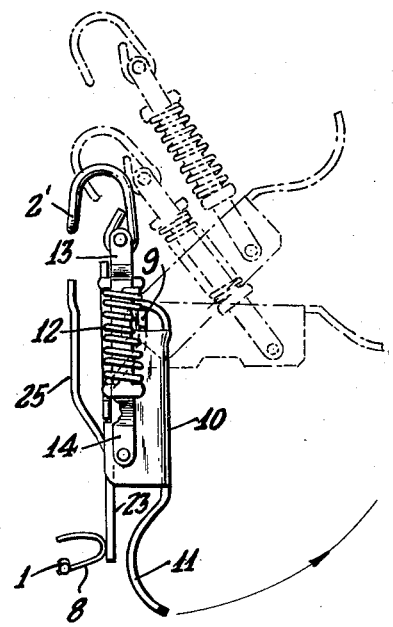
FIG. 4 is a side view of the fastener device illustrating the device in its closed and (in dotted outline) its open positions.
Figure 5:
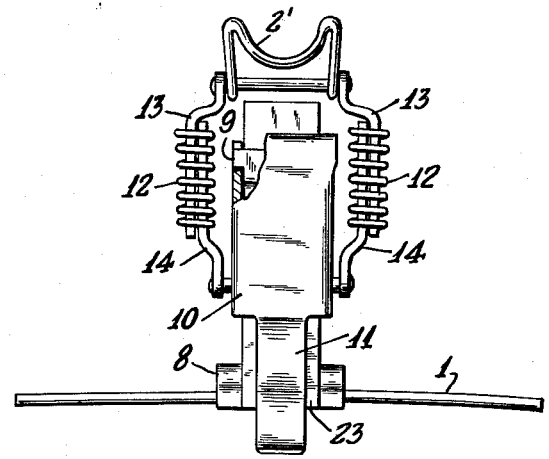
FIG. 5 is a front view of the same fastener device as that shown in FIG. 4.

The elements of rim clip 5' are spring bar 1, channel member 8, and clip base 23 which is welded to member 8 (see FIGS. 4 and 5). Base 23 has limited rotation within fastener pivot 9 in fastener body 10. Tongue 25 is welded to base 23, preventing fastener 6 from opening on outward bowing of tire 4. Hook portion 2' is rotatably attached to fastener body 10 through two arms, 13 and 14, interlocked by spring 12.

In operation, fastener 6 is secured to wheel rim 3. Fastener clip 17 (see FIG. 6) is then interlocked onto fastener 6 by horizontal movement of hook portion 2' of the fastener and the similarly constructed hook portion 24 of fastener clip 17, to which is attached chain 7. Vertical pressure interlocks the hook portions. Pressure on fastener handle 11 (downward pressure if spring bar 1 is on rim 3 when that portion of the rim is upward) applies sufficient tension to chains 7 to hold it affixed to tire 4 under all road conditions. An elastic member may be positioned between chain 7 and fastener 6 to reduce noise and wear.

Figure 3:
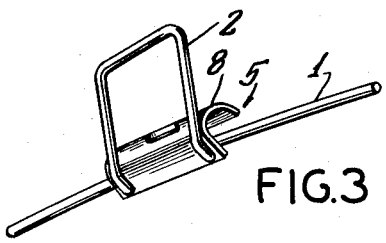
FIG. 3 is a perspective view of the same rim clip, shown in FIG. 2.
Figure 2:
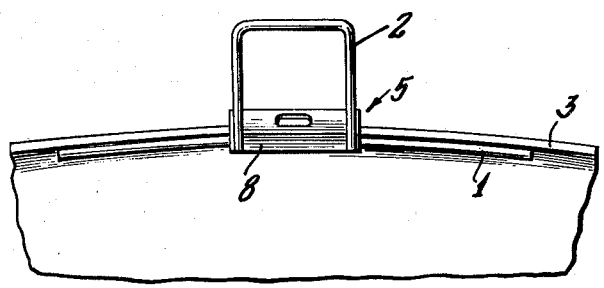
FIG. 2 is a side view of the novel rim clip fastened to the rim of an automobile wheel.

In another embodiment, rim clip 5 is separate from fastener 6 (see FIGS. 2 and 3). In this embodiment, rim clip 5 is removably fastened onto wheel rim 3 and consists of spring bar 1, channel member 8 and hook portion 2. Bar 1 is of heavy spring steep wire and is welded to channel member 8. Channel member 8, of spring sheet steel, is welded to hook portion 2 of heavy wire. Rim clip 5, once secured to wheel rim 3, need not be removed on removal of fastener 6 and chain 7. Although wheel unbalance due to clip 5 is unlikely, due to its light weight at very high speed or other situations where fine wheel balance is desired, a plurality of clips 5 may be secured symmetrically about the circumference of rim 3.

Figure 6:
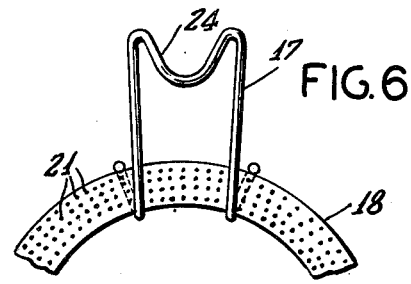
FIG. 6 is a top view of a locking clip fastened to the novel resilient cross-member.
Figure 9:
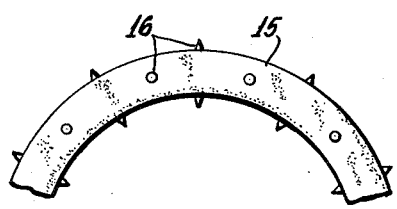
FIGS. 7 and 9 are top views of other novel resilient cross-members.

In FIG. 6 an alternative to chain 7 is shown in which fastener clip 17 is secured to flexible belt 18. Belt 18 is composed of rubber compound similar to that of automobile tires, partially imbedded in which is a grit material having high friction against the road. Suitable friction materials include emery, dolamite and Carborundum. FIG. 9 shows another alternative to chain 7 consisting of flexible belt 15 in which hard bits are imbedded whose points 16 extend beyond the surface of the belt. In belt 15 the bits are preferably arranged so that points 16 extend from its sides as well as its outer surface. Belts 18 and 15 are superior to conventional metal chains, in that rubber is lighter, more comfortable to handle in freezing temperature, and will not rattle when stored in an automobile luggage compartment.

Figure 7:
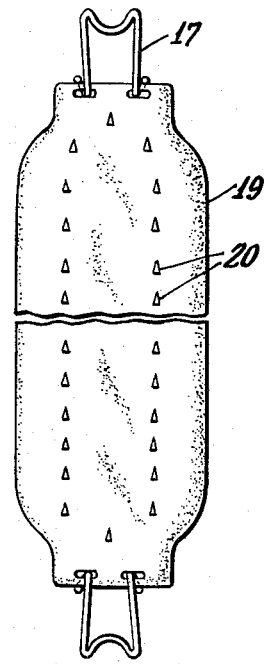

FIG. 7 illustrates another alternative to chain 7. Fastener clip 17 is secured to flexible sheet 19. Preferably, sheet 19 is of rubber and has therein openings 20. On snow, sheet 19 crumples up to form a roll having high frictional contact, while on bare roads sheet 19 lies flat against tire 4.

The forms of the invention herewith shown and described are preferred embodiments. Various changes may be made in their shape and arrangement of parts within the invention and the scope of the subjoined claims.

I claim:

1. A unitary clip for fastening on the rim of wheels comprising a channel member adapted to fit onto the rim, a resilient spring bar attached to the channel member and adapted to exert pressure on the rim and a hook portion as a unitary part of the clip adapted for the hooking thereon of anti-skid means, wherein the length of the spring bar is of the order of a few times the length of the channel member.

2. A clip as claimed in claim 1 and further characterized in that the channel member and the spring bar are of spring steel.

3. An automobile wheel comprising a hub and an annular channel having radially outwardly extending rim flanges, said rim flanges having mounted thereon a unitary clip comprising a channel member mounted on the rim flange, a resilient spring bar having a length in the order of a few times the length of the channel member attached to the channel member and adapted to exert pressure on the rim at the bar's ends, and a hook portion as a unitary part of the clip adapted for the hooking thereon of anti-skid means.

4. An anti-skid device for attachment to a wheel having a channel member with radially outwardly extending rim flanges comprising a fastener adapted to be shorted when closed and two clips for respectively the inside and outside rim flanges of the wheel, each clip being unitary and comprising as portions thereof a spring channel member, a spring bar adapted to exert pressure on the rim and having a length a few times the length of the clip's channel member and attached to the spring channel member and a hook portion, the device further comprising a rubber belt having a high frictional surface and means at each of the belt's opposite ends for removably inter-locking the belt to the hook portions of the clips.

References Cited in the file of this patent

UNITED STATES PATENTS

| | | |
|---|---|---|
| 1,478,059 | Pye | Dec. 18, 1923 |
| 1,529,558 | Staggers | Mar. 10, 1925 |
| 2,270,692 | Stanton | Jan. 20, 1942 |
| 2,609,027 | Locke | Sept. 2, 1952 |
| 2,632,491 | Eisner | Mar. 24, 1953 |
| 2,682,907 | Krueger | July 6, 1954 |
| 2,898,968 | Coven et al. | Aug. 11, 1959 |